United States Patent [19]

Lachey

[11] 4,199,115

[45] Apr. 22, 1980

[54] WIRE CONTROL DEVICE FOR HIGH SPEED STATOR WINDING MACHINE

[75] Inventor: Richard N. Lachey, New Carlisle, Ohio

[73] Assignee: The Globe Tool and Engineering Company, Dayton, Ohio

[21] Appl. No.: 897,481

[22] Filed: Apr. 18, 1978

[51] Int. Cl.² .................................................. H02K 15/085
[52] U.S. Cl. .................................................. 242/1.1 R
[58] Field of Search ................. 242/7.05 C, 7.05 B, 242/7.05 R, 1.1 R; 57/108; 29/596

[56] References Cited

U.S. PATENT DOCUMENTS

| 535,029 | 3/1895 | Sullivan | 57/108 |
| 539,561 | 5/1895 | Whitaker | 57/108 |
| 3,323,734 | 6/1967 | Peters | 242/1.1 R |
| 3,822,830 | 7/1974 | Peters | 242/1.1 R |

Primary Examiner—Billy S. Taylor
Attorney, Agent, or Firm—Dybvig & Dybvig

[57] ABSTRACT

The winding forms of a 2-pole stator winder located most remotely from the wire sources are encompassed within a wire control device that restricts outward ballooning of the wires from the winding head. The wire control device is movable to a position remote from the winding forms to permit removal of the winding forms from the winding area.

3 Claims, 2 Drawing Figures

WIRE CONTROL DEVICE FOR HIGH SPEED STATOR WINDING MACHINE

BACKGROUND OF THE INVENTION

This invention relates to a wire control device especially adapted for use in the high speed winding of 2-pole stators. However, the invention is not necessarily so limited.

Procedures for winding coils on 2-pole stators with the use of winding forms that are temporarily locked to the unwound stators are described in U.S. Pat. No. RE 25,281 granted to H. W. Moore on Nov. 6, 1962, and U.S. Pat. No. 3,251,559 granted to H. W. Moore on May 17, 1966. A typical 2-pole stator winding machine includes a winding head or shuttle having a pair of wire guide nozzles or needles. Two wires, one for each of the needles, are coursed from a pair of wire supply spools through the shuttle and extend out of the needles. The shuttle is reciprocated to repeatedly pass in opposite directions through the stator core and the winding forms connected thereto. At each end of its reciprocatory travel the shuttle is oscillated about its axis, the direction of oscillation being opposite at opposite ends of the stator. Accordingly, the coil end turns are formed during the oscillatory motions and the coil sides are formed during the reciprocatory motions of the shuttle.

At the beginning of the winding of coils on a stator, the forward ends of the wires are clamped or tied down and the wires exiting from the supply spools are coursed through tensioning and dereeling devices so that, ideally, the wires are under tension throughout the winding operation and the coil turns will closely follow the contours of the winding forms. A typical prior tensioning and dereeling device is shown in U.S. Pat. No. 2,643,075 granted to K. A. Moore on June 23, 1953. Higher speed winding machines require more complete control of the wire tension than can be provided by the device shown in the above K. A. Moore patent. For high speed stator winders, it is desirable also to include a powered wire takeup device which operates in synchronism with the winding shuttle, such a takeup device being shown in the above mentioned U.S. Pat. No. 3,251,559. In general, the wire takeup device shown in the '559 patent draws wire when the winding head is not drawing wire and then releases the wire when the winding head is drawing wire so that there is a more uniform demand for wire from the dereeler. The apparatus shown in the latter patent has been successfully used on stator winding machines having shuttle spindles which operate in the range of 800 or 900 complete strokes per minute.

More recently, stator winding machines having shuttle speeds operating in the range of 1000 to 1250 or more complete strokes per minute are being developed, and it has been discovered that a combination of a dereeling device such as shown in the above mentioned K. A. Moore U.S. Pat. No. 2,643,075 and the powered wire takeup device shown in the H. W. Moore U.S. Pat. No. 3,251,559 do not adequately control the wire tension. As a result, the wire exiting from the winding head may tend to balloon outwardly instead of closely following the guide surfaces which are provided for the wire. The wound coils have loosely formed turns and, especially with fine wire, breakage may occur.

More elaborate tensioning and dereeling devices have been developed especially for high speed winders operating in excess of 800 or 900 complete strokes per minute, one such device being shown in U.S. Pat. No. 4,062,502 granted to K. E. Peck, Jr., on Dec. 13, 1977. However, to date there has been no fully satisfactory tensioning and dereeling device developed for use with a high speed stator winder operating in the range of approximately 1200 complete strokes per minute without the formation of some looseness in the wound coils and occasional wire breakage. Wire breakage is believed to be caused by abrupt reversals in the directions of shuttle movement and also because the wire ballooning outwardly from the shuttle needles snag on parts of the stator being wound or on nearby parts of the machine. It has been suggested to locate shields between the winding needles and parts on which the wires tend to snag. However, so far as known, no fully satisfactory shield has been developed.

SUMMARY OF THE INVENTION

This invention provides for a wire control device for a high speed stator winding machine that enables the winding of coils with tighter turns resulting from the wire more closely following the contours of the winding forms and minimizes wire breakage.

The wire control device of this invention comprises a guard or shield that surrounds the winding forms on the side of the stator being wound most remote from the wire supply spools. The internal surfaces of the guard or shield are located sufficiently close to the winding forms that wire tending to balloon outwardly from the winding needles will immediately strike the internal surfaces of the guard or shield so that ballooning is severely restricted.

The guard or shield is mounted for movement toward and away from the winding station to permit the winding forms to be moved as may be required for automatic winding procedures. Conveniently the guard or shield can be mounted on a carriage and powered by an air actuator or the like device.

Tests using the wire control device of this invention indicate that the coils wound using the device are more tightly wound and the instance of wire breakage is substantially reduced as compared to identically operating winding machines which do not utilize the device.

BRIEF DESCRIPTION OF THE DRAWINGS

In FIG. 1 winding forms which are adapted to be locked to the stator core are shown spaced from the stator core in preparation for the locking procedure and a wire shield forming part of this invention is positioned remotely from the stator.

DESCRIPTION OF THE PREFERRED EMBODIMENT

Figure 1:
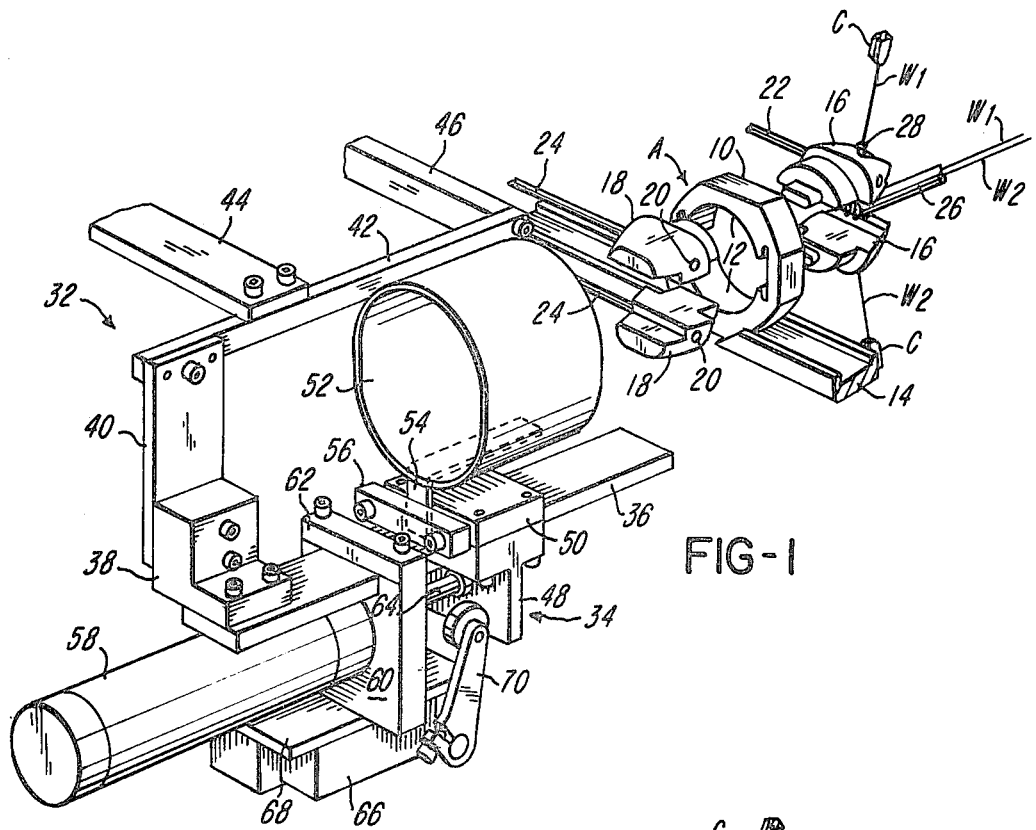
FIG. 1 is a perspective view with parts broken away and parts omitted of a portion of a stator winding machine and a wire control device in accordance with this invention.

This invention is directed to the winding of coils of wire on stators and particularly on stators of the type generally designated 10 having two pole pieces 12 about which coils of wire are to be wound. To accomplish the winding, the stator 10 is positioned at a winding station A on a horizontal track 14 and two pairs of winding forms 16 and 18 are locked to one another and to the stator frame 10 in readiness for the winding of coils. Those familiar with the art will recognize that the representations of the stator frame 10 and the winding forms 16 and 18 are simplified, parts such as cell liners or insulators being omitted from the representation of the stator frame 10. A more complete illustration of the mounting of the stator frame at a winding station and of the locking of winding forms to the stator frame is shown in U.S. Pat. No. 3,901,454 granted to A. C. Reiger, Jr. on Aug. 26, 1975.

In preparation for the winding of coils onto the pole pieces 12, the winding forms 16 and 18 may be spaced outwardly from the stator frame 10 as illustrated in FIG. 1 and held by support pins such as those illustrated at 22 and 24 and other support devices not shown. The support pins 22 and 24 may be mounted on carriages or other movable devices forming part of winding form support assemblies that are known to those familiar with the art. By virtue of the operation of such assemblies, the winding forms are caused to interengage one another and locked to the stator frame 10 as described in the aforesaid A. C. Reiger, Jr. patent or in some other fashion.

The winding of a pair of coils, one about each pole piece 12, is accomplished by reciprocatory and oscillatory movements of a winding head or shuttle 26 which has a pair of generally radially extending wire guide nozzles or needles 28 and 30 projecting from its distal end. A pair of wires, designated $W_1$ and $W_2$, from suitable sources of wire such as supply spools (not shown) enter the rearward end (not shown) of the shuttle 26 and exit from the nozzles 28 and 30. The free ends of the wires $W_1$ and $W_2$ are tied down or clamped, such as by clamp devices C, prior to the commencement of the winding of the coils. To wind the coils, the shuttle 26 is reciprocated to repeatedly pass in opposite directions through the stator frame 10 and the winding forms 16 and 18. At each end of its reciprocatory travel, the shuttle 26 is oscillated about its axis, the direction of oscillation being opposite at opposite ends of its reciprocatory travel. As a result, coil end turns are formed against the opposite faces of the stator core 12 during the oscillatory motions of the shuttle 26 and coil sides extending axially along the stator 10 are formed on opposite sides of the pole pieces 12 during the reciprocatory motions of the shuttle. A variety of drives for the shuttles of stator winders are known. Hence none is described herein. The preferred drive is described in U.S. patent application of Hyman B. Finegold, Ser. No. 852,566, filed Nov. 17, 1977, now U.S. Pat. No. 4,158,314 titled High Speed Stator Winders, which application is assigned to the same assignee as the instant application. U.S. Pat. No. 3,460,770 granted to R. J. Eminger on Aug. 12, 1969, shows an example of another high speed drive.

Tension is maintained on the wires $W_1$ and $W_2$ at their source by tensioning and dereeling devices (not shown) and preferably also takeup devices (not shown). The tensioning and dereeling devices may be of the type shown in the aforementioned U.S. Pat. No. 2,643,075 and the takeup device may be of the type shown in aforementioned U.S. Pat. No. 3,251,559. Ideally the tensioning and dereeling devices including the takeup device would function to cause the wire strands $W_1$ and $W_2$ to closely follow the coil forming surfaces of the winding forms 16 and 18 throughout the winding operation. However, in practice, especially with high speed stator winders when winding coils from fine wires, the wire strands $W_1$ and $W_2$ tend to balloon outwardly at the far end stroke of the shuttle 26, i.e. when it is moving to wind portions of the coils about the winding forms 18, i.e. the forms most remote from the wire sources. As a result, there is some tendency for the wires to become snagged and break on parts of either the stator or the winding machine. Wire breakage may also be caused by the abrupt reversals in direction of the shuttle movement acting upon wire which is not fully under control due to its ballooning outwardly. The loss of complete control of the wire may also result in undesirable, loosely wound coils.

In accordance with this invention, a wire control device generally designated 32 is provided that has been found to substantially reduce the instance of wire breakage and to result in the formation of more tightly wound coils. The wire control device 32 includes a shield mounting carriage generally designated 34 mounted on a slide bar 36 for movement toward and away from the winding station A along an axis parallel to the axis of reciprocation of the shuttle 26. The slide bar 36 is supported by a mounting frame assembly including an L-shaped bracket affixed to the end of the slide bar 36 most remote from the winding station A. A vertical mounting plate 40 connects to the bracket 38. A horizontal mounting bar 42 is connected to the vertical plate 40 and a pair of support plates 44 and 46 connect to the mounting bar 42. The support plates 44 and 46 may be attached to part of the machine fixed in relation to the track 14. As an alternative, if the support pins 24 for the winding forms 18 are mounted on a movable carriage assembly or the like, the support plates 44 and 46 would desirably also be mounted on the same carriage assembly so that the wire control device 32 would move toward and away from the station A with that assembly. It is to be understood that the mounting frame assembly for the slide bar 36 could take a variety of forms so long as some adequately rigid mounting is provided for the slide bar 36.

The carriage 34 may comprise a slide 48 and a slide cap 50 affixed thereto, parts of the slide 48 and the slide cap 50 being grooved or otherwise formed to provide an aperture so as to slide freely upon the slide bar 36. A wire shield 52 is mounted on the slide cap 50 for movement with the carriage 34 by means of an L-shaped bracket 54 affixed to the bottom of the shield 52 and having a shorter depending leg portion clamped to the slide cap 50 by a clamp bar 56.

Figure 2:
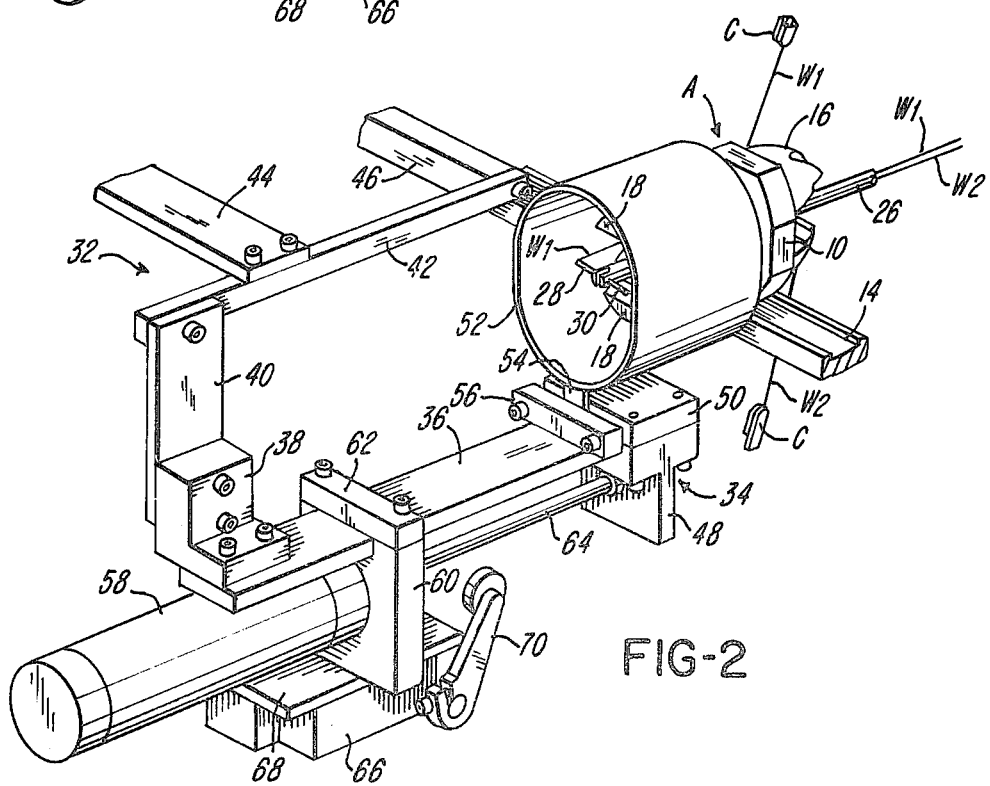
FIG. 2 is a perspective view similar to FIG. 1 but showing parts positioned as they would be during the winding of a coil wherein the winding forms are locked to the stator and the wire shield advanced to a position immediately adjacent the stator.

The slide mounting carriage 34 is moved along the slide bar 36 by means of a double acting air actuator 58 affixed to the slide bar 36 by a mounting plate 60 and a mounting plate cap 62. The actuator 58 drives a piston rod 64 that is connected to the slide 48 so that the carriage 34 and accordingly the wire shield 52 can be positioned remotely from the winding station A as shown in FIG. 1 or moved closer to the winding station A so that the shield 52 is immediately adjacent the confronting face of the stator frame 10. The shield 52 is positioned as shown in FIG. 2 in advance of and during the winding operation and then moved to the FIG. 1 position remotely from the winding station A after the winding is completed to enable removal of the winding forms 16 and 18 from the stator frame 10 and from the area of the winding station A. Those familiar with stator winding machines also realize that there are other types of machines having turrets that are designed to move unwound stators into a winding station with the winding forms already connected thereto and to remove the wound stators, with the winding forms still connected, away from the winding station. Again it is desirable to provide for movement of the shield 52 in such case so that the winding forms can be moved away from the winding station. The wire guard or shield 52 comprises a hollow, tubular body member having a central axis coaxial with the axis of reciprocation of the shuttle 26. When positioned as shown in FIG. 2, with the shield 52 immediately adjacent the stator frame 10, the inner surface of the shield 52 confronts the winding forms 18 and accordingly the end portion of the path of movement of the shuttle 26 past the stator frame 10. The shield inner surface is formed to come as close as possible to the surfaces of the winding forms 18 over which the wires pass when winding coils and to provide clearance within the shield 52 for the movement of the needles 28 and 30 and the coils to be formed. All parts of the inner surface are parallel to the axis of reciprocation of the shuttle 26. It is thus seen that the shield 52 when located immediately adjacent the stator frame 10 provides a continuous inner shielding surface that will be intersected by the axes of the needles 28 and 30 throughout their oscillatory motions at the extreme distal end of the stroke of the shuttle 26. Preferably the entire inner surface of the shield 52 confronting the forms 18 is continuous as illustrated. However, it would be possible to have discontinuities (not shown) in the shield 52 provided that they would be so located that the wires $W_1$ and $W_2$ could only engage an inner surface portion and no other part of the shield 52. The inner surface of the shield 52 should be smooth and polished to avoid scratching of the insulation surrounding the wire or accidental wire breakage.

Although the presently preferred embodiment of this invention has been described, it will be understood that within the purview of this invention various changes may be made within the scope of the appended claims.

Having thus described my invention, I claim:

1. In a 2-pole stator winding machine of the type including winding forms adapted to be connected to a stator at a winding station and adapted to be removed from said winding station and further including a winding shuttle having a pair of substantially radially extending wire guide needles reciprocated relative to surfaces of said stator and said winding forms about which coils of wire are to be wound and oscillated about its axis of reciprocation to draw a pair of wires from wire sources and wind the coils, the improvement comprising wire control means for restricting the ballooning of wires from said needles, said wire control means comprising a shield positioned immediately adjacent said winding station, said shield having inner surface portions parallel to said axis of reciprocation defining a cavity opening to said winding forms and said shuttle, said inner surface portions confronting the end portion of the path of reciprocatory movement of said shuttle and those of said winding forms most remote from said wire sources and being of such extent that the axes of said needles, if extended, would intersect said surface portions during substantially any part of the oscillatory motion of said shuttle occurring when said shuttle is at said end portion of the path of its reciprocatory movement and said inner surface portions being sufficiently continuous that any sections of wires exiting from said needles and engaging said shield contact said inner surface portions, said wire control means further comprising means mounting said shield for movement relative to said winding forms toward and away from said winding station and means for moving said shield from a position immediately adjacent said winding station to a position remote from said winding station to permit removal of said winding forms from said winding station.

2. In a 2-pole stator winding machine of the type including winding forms adapted to be connected to a stator at a winding station and adapted to be removed from said winding station and further including a winding shuttle having a pair of substantially radially extending wire guide needles reciprocated relative to surfaces of said stator and said winding forms about which coils of wire are to be wound and oscillated about its axis of reciprocation to draw a pair of wires from wire sources and wind the coils, the improvement comprising wire control means for restricting the ballooning of wires from said needles, said wire control means comprising a shield, means mounting said shield for movement toward and away from said winding station, means for moving said shield relative to said winding forms from a first position immediately adjacent said winding station to a second position remote from said winding station, said shield having inner surface portions defining a cavity opening to said shuttle and said winding forms and partly receiving in said first position those of said winding forms most remote from said wire sources, said inner surface portions confronting an end portion of the path of reciprocatory movement of said shuttle and being of such extent that the axes of said needles, if extended, would intersect said surface portions during substantially any part of the oscillatory motion of said shuttle occurring when said shuttle is at said end portion of the path of its reciprocatory movement and said inner surface portions being sufficiently continuous that any sections of wires exiting from said needles and engaging said shield contact said inner surface portions, said second position being sufficiently remote from said winding forms to permit removal of said winding forms when said shield is in said second position.

3. The improvement of claims 1 or 2 wherein said shield comprises a hollow tubular body member.

* * * * *